(12) United States Patent
Kiveläet al.

(10) Patent No.: US 6,882,870 B2
(45) Date of Patent: Apr. 19, 2005

(54) PERSONAL MOBILE COMMUNICATIONS DEVICE HAVING MULTIPLE UNITS

(75) Inventors: Seppo Kalervo Kivelä, Salo (FI); Erkki Savilampi, Tampere (FI); Ciaron Daniel Murphy, Kirkkonummi (FI); Pekka Heinonen, Espoo (FI); Harri Okkonen, Espoo (FI); Heikki Rautila, Espoo (FI)

(73) Assignee: Nokia Mobile Phones, Ltd., Espoo (FI)

( * ) Notice: Subject to any disclaimer, the term of this patent is extended or adjusted under 35 U.S.C. 154(b) by 568 days.

(21) Appl. No.: 09/771,445

(22) Filed: Jan. 26, 2001

(65) Prior Publication Data

US 2001/0031622 A1 Oct. 18, 2001

Related U.S. Application Data

(62) Division of application No. 08/960,918, filed on Oct. 30, 1997.

(30) Foreign Application Priority Data

Oct. 31, 1996 (FI) .................................................. 964399

(51) Int. Cl.⁷ .............................................. H04M 1/00
(52) U.S. Cl. ..................... 455/567; 455/41.2; 455/557; 455/550.1
(58) Field of Search .............................. 455/41.2, 567, 455/557, 550.1

(56) References Cited

U.S. PATENT DOCUMENTS

| | | | |
|---|---|---|---|
| 4,291,411 A | 9/1981 | Muller et al. ................... 455/88 |
| 4,647,722 A | 3/1987 | Nishida et al. ................. 379/63 |
| 4,659,878 A | 4/1987 | Dinkins ....................... 455/436 |
| 5,008,864 A * | 4/1991 | Yoshitake ..................... 368/10 |
| 5,054,051 A * | 10/1991 | Hoff .......................... 455/556.1 |
| 5,260,915 A * | 11/1993 | Houlihan ..................... 368/10 |
| 5,274,613 A * | 12/1993 | Seager ........................ 368/13 |
| 5,313,661 A * | 5/1994 | Malmi et al. ............. 455/232.1 |
| 5,467,324 A * | 11/1995 | Houlihan ..................... 368/10 |
| 5,553,312 A | 9/1996 | Gattey et al. ............... 455/11.1 |
| 5,570,413 A | 10/1996 | Ahlberg et al. .............. 455/552 |
| 5,604,921 A * | 2/1997 | Alanara ........................ 455/45 |
| 5,634,201 A | 5/1997 | Mooring ....................... 455/90 |
| 5,659,611 A * | 8/1997 | Saksa ....................... 379/433.1 |
| 5,742,905 A | 4/1998 | Pepe et al. ................... 455/461 |
| 5,877,675 A | 3/1999 | Rebstock et al. ........ 340/286.07 |
| 5,899,855 A | 5/1999 | Brown ........................ 600/301 |
| 5,913,163 A * | 6/1999 | Johansson ................. 455/426.1 |
| 5,960,366 A | 9/1999 | Duwaer ....................... 455/556 |
| 5,960,367 A | 9/1999 | Kita ........................... 455/567 |
| 6,035,035 A * | 3/2000 | Firooz ..................... 379/433.1 |
| 6,208,876 B1 * | 3/2001 | Raussi et al. ............... 455/557 |
| 6,272,359 B1 * | 8/2001 | Kivela et al. ............... 455/567 |
| 6,529,713 B1 * | 3/2003 | Seymour .................. 455/575.2 |

FOREIGN PATENT DOCUMENTS

| | | |
|---|---|---|
| DE | 43 10 230 | 6/1994 |
| EP | 0602828 A1 | 6/1994 |
| EP | 0665655 | 2/1995 |
| EP | 0781018 A1 | 6/1997 |
| FI | 901948 | 10/1991 |
| WO | WO 96/23373 | 8/1996 |
| WO | WO 97/28736 | 8/1997 |
| WO | WO 97/28737 | 8/1997 |

OTHER PUBLICATIONS

No. TSK 19, "Matkaviestinsanasto Mobilteleordlista—Vocabulary of Mobile Communications", pp. 83 & 87, Helsinki 1993, published by Tekniikan sanastokeskus.

* cited by examiner

*Primary Examiner*—David Hudspeth
*Assistant Examiner*—S. Smith
(74) *Attorney, Agent, or Firm*—Perman & Green, LLP

(57) ABSTRACT

A mobile communication device is constructed for use in communicating with a wireless communications network. The device is adapted for carrying on or near the person of the user. For ease of use and adaptability, the various functions of the device are separated into multiple units. The units communicate with each other through a localized communication system in which at least one local traffic channel is generated by the primary unit. To permit bi-directional communication among the units, multiple access protocols are used, either TDMA or CDMA.

14 Claims, 14 Drawing Sheets

PERSONAL MOBILE COMMUNICATIONS DEVICE HAVING MULTIPLE UNITS

This is a Division of application Ser. No. 08/960,918, filed Oct. 30, 1997.

BACKGROUND OF THE INVENTION

The present invention relates to a radio telephone in accordance with the preamble of the accompanying claim 1.

A radio telephone relates in this context to a wireless telephone whereby a radio communication can be arranged with a telecommunication network or another radio telephone. Hand-portable phone relates to a portable radio telephone, such as a mobile phone having a size and design suited for hand. The above definitions are based on publication No. TSK 19, "Matkaviestinsanasto—Vocabulary of Mobile Communications", published by Tekniikan sanastokeskus ry, Helsinki 1993.

The user interface of the radio telephone comprises at least a microphone, earpiece and keys for making a call and answering an incoming call. Additionally, particularly mobile phones comprise a display, whereby the user of the telephone can be given information e.g. of an incoming call.

To use a Hand-portable phone often involves the problem that the telephone starts ringing in situations where the phone is beyond the reach of hands, for example in a pocket of a jacket lying on the car seat, in a bag, inside the breast pocket or in a place otherwise unhandy. Also, the telephone may start ringing in a situation when the answering is difficult in other respect, such as in a bus, at a meeting or in church.

Attempts have been made to overcome the drawback by placing the entire radio telephone on a wrist strap, wherein the wrist telephone would be easy to carry along and, when the phone starts ringing, it would be close to the user and therefore easy to answer. For instance European patent application EP-602828 introduces a solution where the radio telephone is placed to a wrist-watch type case. Most parts, including the microphone, of the radio telephone are positioned in the body of the case, mainly an earpiece being placed in the cover part. When a call is initiated, the cover part is opened, wherein the distance between the microphone and the earpiece can be increased, which facilitates the use of the wrist telephone. The above mentioned publication mainly attempts to describe the mechanical implementation of a wrist telephone. Also U.S. Pat. No. 5,260,915 introduces a solution for mechanical realization of a wrist telephone. In practice, the prior art provides no means for packing the radio telephone to be compact in a manner that it would be sensible to place it on wrist, inasmuch as reasonable operation times are desired for the phone. Batteries for known radio telephones are still considerably larger and heavier than the entire wrist strap, wherein adapting the radio telephone on the wrist strap would require that a very small battery was used, which, however, would mean that the operation time of the wrist telephone would be very short at a single charge.

A further problem of the wrist telephone is how to implement the antenna. To place the antenna too close to the user's body, e.g. wound around the wrist strap, will deteriorate the properties of the antenna. This sets limitations on the operation distance of the wrist telephone from the base station or another radio telephone.

Yet another drawback of known wrist telephones is the fact that the efficiencies of the transmitters are so low that thermal problems are caused when the entire radio telephone is compactly packed on a wrist strap. The thermal load directed to the wrist telephone is further increased by the wrist of the user.

SUMMARY OF THE INVENTION

An object of the present invention is to provide an improvement to the use of radio telephone, in particularly in view of answering the radio telephone. The invention is based on the idea that at least a part of the user interface of the radio telephone is constituted in a manner that it is easy to carry along by the user, and to be kept within the reach of hands. To achieve this object, the radio telephone is divided at least into a first part and a second part, wherein the first part comprises at least a power supply, a radio part (transceiver) to communicate within the radio telephone system, e.g. with a base station or another radio phone, an antenna and data transfer means for communicating with the second part. The second part comprises at least keys and data transfer means for communicating with the first part. When applying the invention to a digital phone, such as a GSM mobile phone, the digital signal processing functions are advantageously placed to the first part. The present invention is characterized by what is described in the characterizing portion of the accompanying claim 1.

The present invention provides considerable advantages over solutions of prior art. When the second part of the radio telephone of the invention is close to the user, e.g. on wrist, the telephone can easily be answered by keys or the like of the second part. Further, the whole call can be carried out by utilizing the second part only. Thus, the first part can under normal use circumstances be kept on a belt, in a pocket, bag or even in glove locker of a car during the whole call.

A link communication in accordance with the invention can be implemented in a manner that the frequencies used in the connection depend on the frequencies used by the radio part, wherein several radio telephones of the invention can be adjacent to each other and used simultaneously, without disturbing each other.

In the solution of the invention, the parts that cause problems in wrist telephones, such parts as the transmitter of the radio part and the battery, are positioned to the first part, wherein the wrist part can be formed to have a low power consumption. Thus, the wrist part can also be non-chargeable battery operated.

In the radio telephone of the invention the antenna of the radio part is, in the first part, further from the user's body, wherein the positioning problems of antennas of known wrist phones can be eliminated.

DESCRIPTION OF THE DRAWING

In the following, the invention will be described in more detail with reference made to the accompanying drawings. In the drawings

DETAILED DESCRIPTION OF THE INVENTION

Figure 1A:
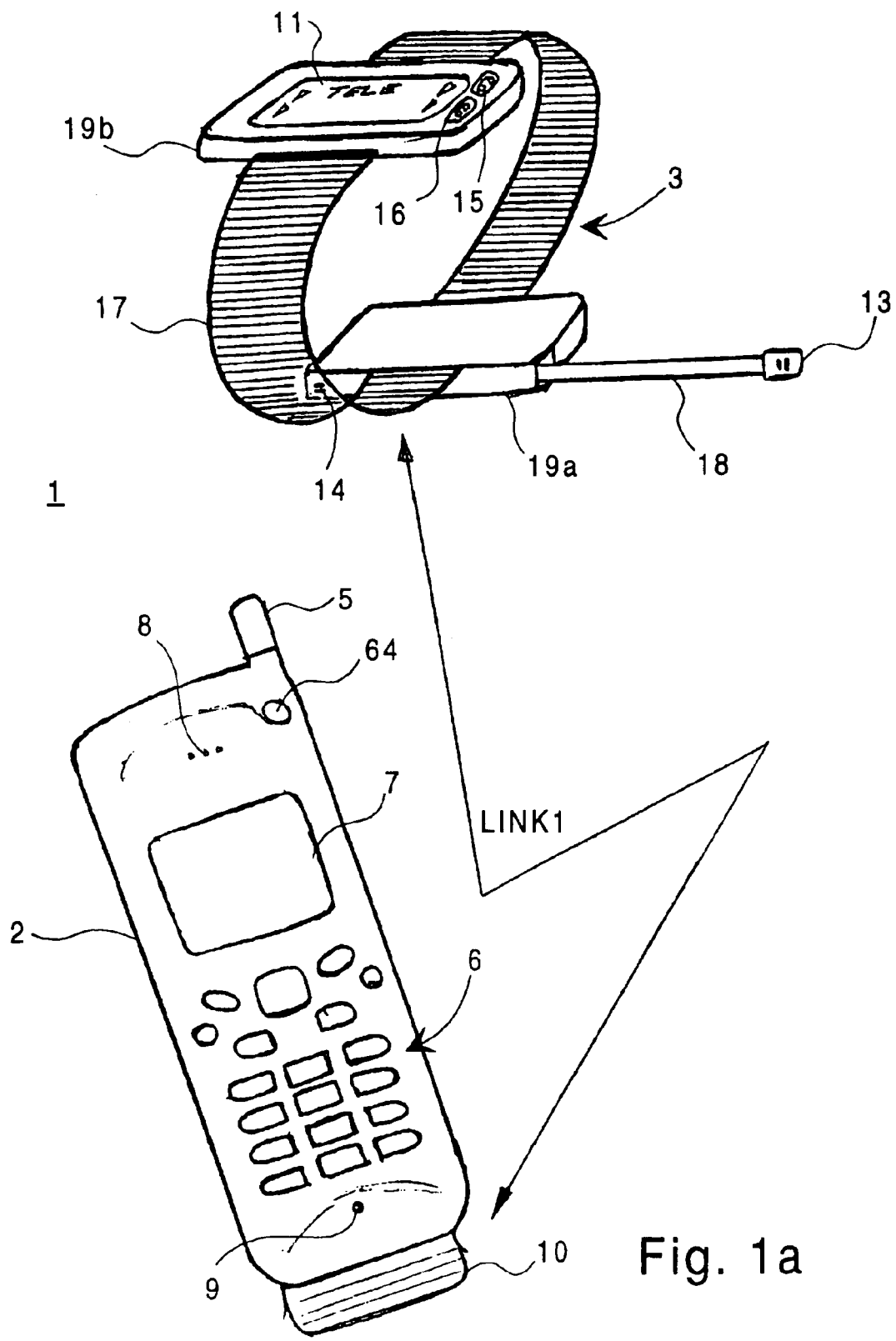
FIG. 1a shows a radio telephone in accordance with the first advantageous embodiment of the invention.

A radio telephone 1 of the first advantageous embodiment of the invention in accordance with FIG. 1a is composed of a first part, i.e., a telephone part 2, and a second part, i.e., a wrist part 3 in data transfer communication with the first part. The telephone part 2 used is preferably a radio telephone, such as a GSM mobile telephone. The telephone part 2 comprises a radio part 4, having among other things a transmitter/receiver 49 of the radio telephone, antenna 5 of the radio part, keypad 6 and display means 7, earpiece 8 and microphone 9. Furthermore, the telephone part 2 comprises a link module 10 for creating a data transfer communication between the wrist part 3 and the telephone part 2. The link module 10 is mounted advantageously to a system connector 12 or the like of the telephone part 2, via which system connector the signalling between the link module 10 and the telephone part 2, which is necessary in the data transfer communication, can be arranged.

The wrist part 3 in accordance with the first embodiment of the invention comprises at least a supplementary earpiece 13, supplementary microphone 14, handset keys, i.e., key for answering the call 15, and key for terminating the call 16, as well as means 36 for creating an alarm signal. In addition, in the wrist part 3 in accordance with the first embodiment of the invention, a supplementary display device 11 is arranged for showing information corresponding to those shown on the display means 7 of the telephone part, e.g. the calling telephone number or the name of the person who calls. Furthermore, the wrist part 3 preferably comprises a wrist strap 17, wherein the wrist part 3 can easily be attached to the wrist so that, if necessary, it is carried along with the user. In FIG. 1a, the wrist part 3 is shown in a functional position, wherein a supplementary earpiece 13, attached at a second end of an attachment arm 18, is drawn out of a first wrist case 19a. Thus, the distance between the supplementary earpiece 13 and the supplementary microphone 14 nearly corresponds to the distance between the ear and the mouth of the user. When the wrist part 3 is mounted on the wrist, the supplementary earpiece 13 is situated at the hollow of the hand. The palm is placed against the ear, wherein the supplementary earpiece 13 is very close to the ear and the supplementary microphone is close to the mouth. The hollow of the hand is around the ear, which attenuates the influence of external noises and thus improves the understandability of the speech. After the call is terminated, the supplementary earpiece 13 is pushed back to the first wrist case 19a and the call terminating key 16 is pushed.

In this specification, the data transfer communication between the telephone part 2 and the wrist part 3 is designated a first link communication LINK1. Several various alternatives exist for providing link communications. One solution is to implement the link connection in a galvanic manner, i.e., by conductors or a cable. Thus, the distance between the telephone part 2 and the wrist part 3 is restricted by the length of the conductors or the cable. The advantage of this solution is the fact that the connection functions certainly in spite of strong external disturbances. This solution is applicable in cases when the telephone part 2 is close to the user, e.g. in a jacket pocket, and the wrist part 3 is attached to the wrist.

The link connection can also be implemented as ultrasonic data transfer, which has been utilized for example in remote controls for televisions. Thus, in this case an ultrasonic signal modulated by information to be transmitted is created in the ultrasonic transmitter which is demodulated in an ultrasonic receiver. By using ultrasound, no visual connection is necessary between the telephone part 2 and the wrist part 3. However, the ultrasound attenuates very quickly, wherein it may be that the communication is not possible when the telephone part 2 is covered, e.g. inside the clothes.

A link communication can also be implemented by infrared data transfer, wherein both the telephone part 2 and the wrist part 3 comprise an infrared transmitter and infrared receiver. The infrared data transfer requires an unhindered passage for the infrared light beams, either directly or via reflecting surfaces, such as windows and other shining surfaces from the infrared transmitter to the infrared receiver, which restricts the utility of this data transfer method.

Figure 1B:
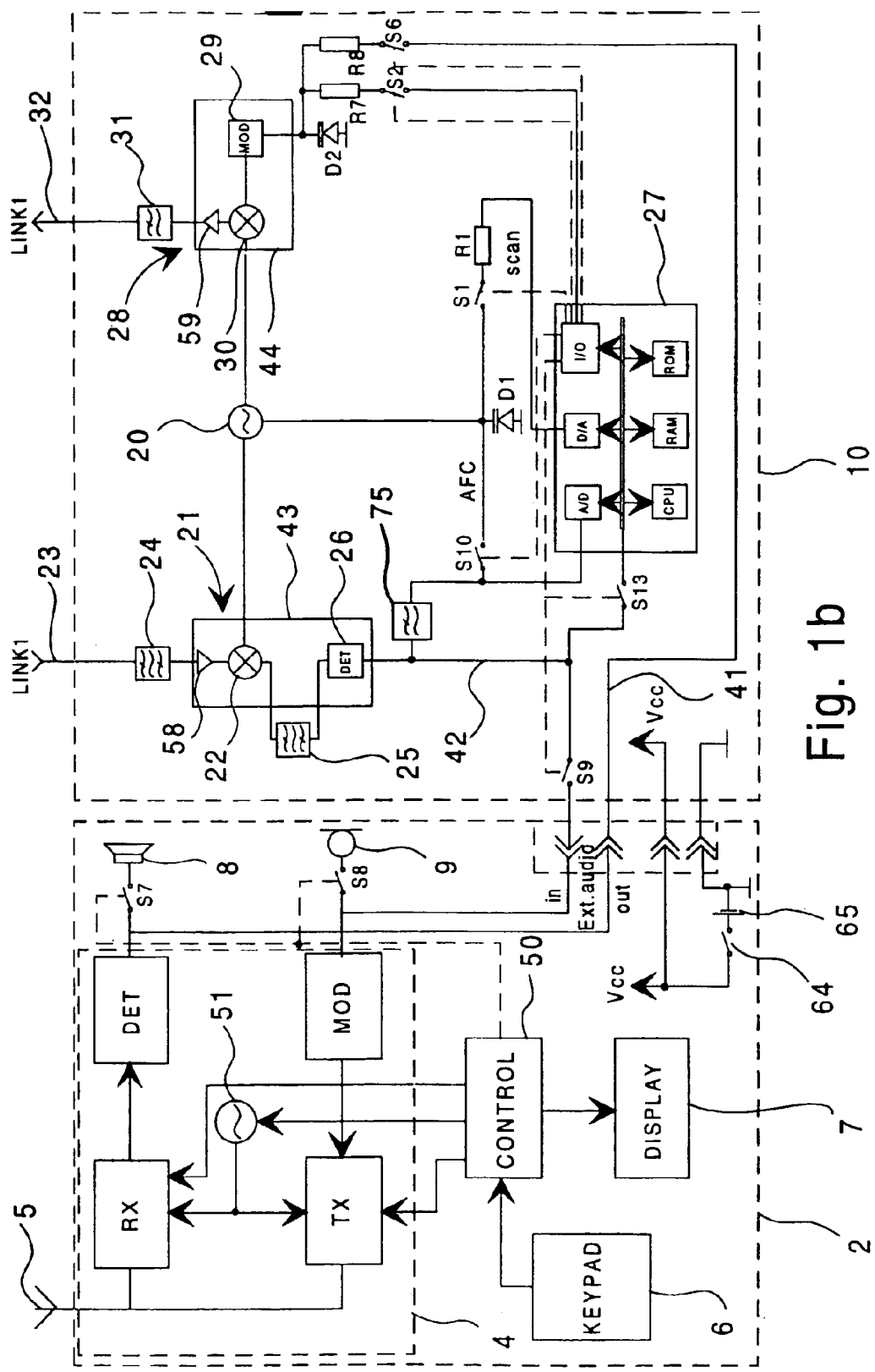
FIG. 1b shows a reduced block diagram of an advantageous alternative implementation of the first part of the radio telephone in accordance with the first advantageous embodiment of the invention.
Figure 1C:
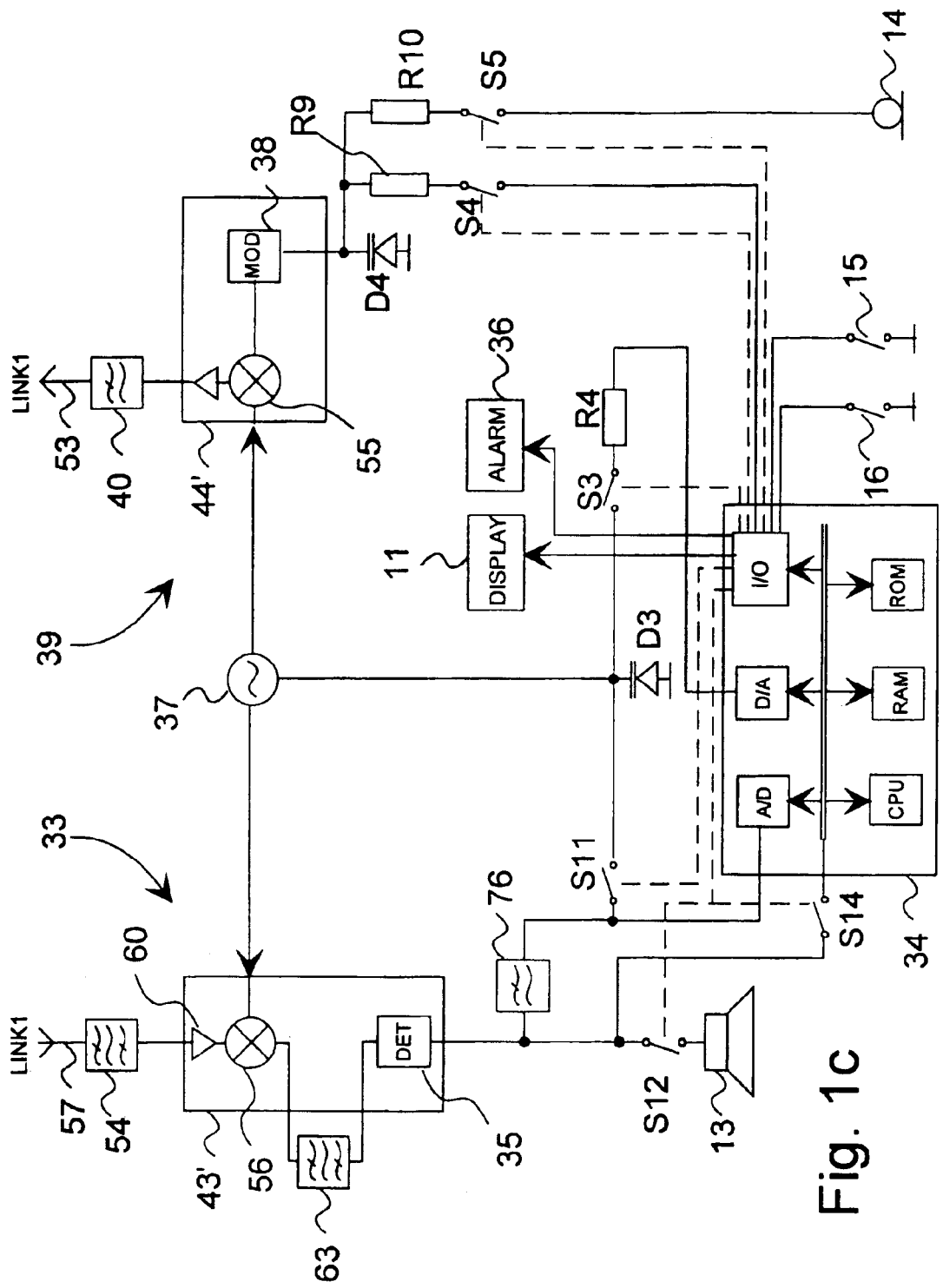
FIG. 1c shows a reduced block diagram of an advantageous alternative implementation of the second part of the radio telephone in accordance with the first advantageous embodiment of the invention.

The most advantageous alternative implementation to create a link communication is the radio communication, wherein no visual communication is required, and neither does the attenuating of the signal cause any problems during normal use. FIG. 1b shows, in the telephone part 2, the implementation of the first link communication LINK1 used in the radio telephone 1 in accordance with the first advantageous embodiment of the invention. The modulation method used in the link is e.g. frequency modulation (FM) or a digital modulation method. In the link communication, the frequency range used is not relevant for applying the invention as such. The frequency range is advantageously divided into channels, wherein a specific portion of the frequency range is reserved for each channel. The width of the channel is based on e.g. the modulation method used. For instance in frequency modulation, the carrier frequency is set to the medium frequency of the channel (channel frequency), wherein the frequency of the frequency modulated signal changes according to the modulating signal on both sides of the channel frequency. The maximum frequency deviation is no more than a half of the width of the frequency range reserved for the channel.

The link communications are bi-directional, preferably in the manner that in analog telephone systems, simultaneous transmission is possible to both directions of the link: in the first link communication LINK1 from the telephone part 2 to the wrist part 3 and from the wrist part 3 to the telephone part 2. Thus, the transmitter of the link module in the telephone part transmits on the free channel frequency of the first transmission band (uplink band), and the transmitter of the wrist part transmits on the respective channel frequency of the first reception band (downlink band). In practical embodiments the difference between the transmission channel frequency and the reception channel frequency is set to constant (duplex separation).

In connection with digital telephone systems utilizing the time-division multiple access (TDMA), it is also to be noted that within the same geographical area several telephones can be operating at the same frequency so that for each telephone a time slot is reserved for communication. In such systems, also time division can be used in the link of the invention and the time slot used by the link can be linked up with the time slot used by the telephone.

The analog radio phone 1 in accordance with the first advantageous embodiment of the invention operates as follows. By means of its menu functions (not shown) the radio phone 1 is set to UAI operation mode (User Air Interface), wherein the link module 10 is in use. When a call arrives to the telephone part 2, the creation of the first link communication LINK1 is initiated. The receiver 21 of the link module of the telephone part 2 is set to scan the reception band selected for the first link communication, e.g. by switching a voltage in a form of a triangular wave to a scan line and by closing the switch S1. The triangular wave is created e.g. by digital/analog converter (D/A) of a controller 27. The triangular wave is directed via the switch S1 and the resistance R1 to a capacitance diode D1. A change in the voltage between the conductors of the capacitance diode D1 causes a change in the capacitance of the capacitance diode D1. The capacitance diode D1 is coupled to the frequency control circuit of a local oscillator 20 of the link module, wherein the frequency of the local oscillator 20 of the link module changes in relation to the change in the voltage of the scan line. The frequency created by the local oscillator 20 of the link module is directed to a mixer 22 of the receiver of the link module. A reception antenna circuit of the link module is connected to the mixer 22, receiving circuit comprising a reception antenna 23 of the link module, first band-pass filter 24 and high-frequency amplifier 58 of the receiver of the link module. The pass band set to the first band-pass filter 24 is the frequency range of the reception band selected for the first link communication, wherein such radio frequency signals which are situated within said frequency range are directed to the mixer. From the output of the mixer 22, a mixing result is obtained which is the difference between signals of the local oscillator frequency and the radio frequency to be received, said difference being directed to the detector 26 via a second band-pass filter 25. The width of the pass band of the second band-pass filter 25 corresponds substantially to the width of the channel, wherein the signals situated possibly in adjacent channels cause no disturbance to the demodulation. From the output of the detector, a demodulated signal 42 is obtained. The demodulated signal is further directed to a low-pass filter 75, the low-pass filtered signal is passed to a AFC-line, the voltage level of which is monitored during the scanning by a link module controller 27. In the apparatus of FIG. 1b monitoring is performed by analog/digital converter (A/D) of the controller 27, said converter converting the voltage value to a digital value which is processed in the application software of the controller 27. The voltage level of the AFC line is relative to the DC level of the output of the detector 26. When the signal transmitted by the wrist part is being received, the AFC line can be used for keeping the local oscillator frequency of the receiver locked to the carrier frequency of the signal transmitted by the wrist part.

The controller 27 concludes on the basis of the voltage level of the AFC line whether the reception band has other communication. If no other communication exists, any channel frequency of the reception band can be tuned in. In case other communication is found, a vacant channel has to be selected on the reception band. In case there is no vacancy, no communication with the wrist part can be created on the selected reception band. In case a vacant space is found, the receiver is tuned to the respective channel frequency, i.e., a control voltage corresponding to the selected channel frequency is set to the capacitance diode D1. Thus, the capacitance of the capacitance diode D1 sets the frequency of the local oscillator 20 of the link module to correspond to the selected channel frequency. At the same time when the receiver of the link module is tuned to the correct channel frequency, also the transmitter of the link module is tuned to the frequency of the duplex separation, because in the present embodiment the local oscillator 20 of the link module is common to both the receiver 21 of the link module and to the transmitter 28 of the link module.

The received demodulated signal can be obtained from the audio output line 42 of the link module. When the data signal is being received, the signal is directed to the controller 27 of the link module which examines the received data by closing a switch S13. The audio signal, however, is directed to the telephone part 2 by closing a switch S9. When the transmission of the wrist part is being received, the AFC line can be switched to the capacitance diode D1 by closing a switch S11, wherein the receiver 21 has been locked to the frequency of transmission.

After a free reception channel has been found the formation of a data transfer communication between the telephone part 2 and the wrist part 3 can be initiated. The controller 27 of the link module switches on the receiver 28, closes the switch S2 and supplies to the data input of the modulator of the link module a password which is common to the link module 10 and the wrist part 3.

The password can be advantageously the international mobile equipment identification (IMEI) of the radio telephone 1. The password is also stored in the wrist part 3. Thus, upon an incoming call, e.g. the controller 27 of the link module reads the equipment identification IMEI and possibly also other information stored in the radio telephone 1, and sends the information to the wrist part 3. In the wrist part 3, it is examined if the equipment identification is stored in the wrist part, and in the positive case, the received equipment identification IMEI is compared with the equipment identification stored in the wrist part 3. If an equipment identification is stored in the wrist part 3 and it is the same as the equipment identification received, an alarm of the incoming call is generated. In other cases, no alarm will be generated, and the link connection will be closed. By this arrangement it can be secured that the wrist part 3 is the wrist part 3 of the radio telephone 1 in question. This identification may be necessary in situations in which there are several radio telephones 1 according to the invention within the range of action of the link connection LINK1.

FIG. 1b shows the transmitter 28 of the link module, which transmitter operates in the following manner. The modulating signal is directed to a capacitance diode D2 having a capacitance which varies according to the modulation signal. The data signal is directed via a switch S2 and a separating means R7, and the analog signal via a switch S6 and a separating means R8. The separating means R7, R8 mainly operate as impedance matching means. The basic frequency of the oscillator 29 to be modulated is thus selected that between the radio-frequency signal to be transmitted and the radio-frequency signal to be received a frequency difference is formed, this difference corresponding to the value of the desired duplex separation. By using a common local oscillator it is possible to tune both the receiver and the transmitter in a manner that the duplex separation remains constant regardless of the channel in use. As a modulation result a frequency modulated signal is obtained, this signal being directed to the first input of the mixer 30 of the link module transmitter. The frequency of the local oscillator 20 of the link module is directed to the second input of the mixer 30, said frequency being set in a manner that the receiver tunes to a desired reception frequency. Thus, a modulated transmission channel frequency signal is obtained from the output of the mixer, said signal being further amplified in a high-frequency amplifier 59 of the link module and low-pass filtered in the low-pass filter 31, e.g. to attenuate spurious responses. From the low-pass filter the modulated radio-frequency signal is passed to the transmission antenna 32 of the link module.

The receiver of the wrist part is switched on at predetermined intervals, for example every five seconds, and the reception band of the wrist part, i.e., the transmission band of the link module 10, is scanned. The controller 34 of the wrist part simultaneously controls the output of the detector 35 of the wrist part to search for possible transmissions created by the link module of the radio part. In case transmissions are found, the receiver is locked to the transmission and the information included in the transmission is read. In case the password of the wrist part is found, the receiver of the wrist part is locked to the respective frequency. If the own password of the wrist part is found, an alarm is generated in the means 36 for creating an alarm signal to inform the user of an incoming call, e.g. by means of a sound or light signal, vibration or tickling.

The meaning of this periodical switching on is to decrease the power consumption of the wrist part 3. The operating voltages has to be switched on in the wrist part only during the call. Otherwise the operating voltages can be switched off, only at certain intervals it is checked whether the radio part has received a call.

The receiver 21 of the link module of the radio part can save power by operating in a corresponding manner, i.e., it controls only at certain intervals whether there exists any transmissions on its reception band, i.e., on the transmission band of the wrist part, otherwise the operating voltages are switched off.

The operating voltages for the transmission parts of the link module 10 and transmission parts of the wrist part 3 are switched on only during a call.

The control signals for the operating voltages of the receiver and the transmitter of the radio part 2 of the radio phone itself are not preferred for the switching signals of the operating voltages of the transmitter and the receiver of the link, because they would cause higher power consumption in the link part due to e.g. the fact that the operating voltage of the receiver of the telephone cannot be switched off for such a long period of time as in the link module 10.

The operation of the transmitter/receiver of the wrist part 3 corresponds, at its substantial parts, to the operation of the transmitter/receiver of the link module 10. The receiver 33 of the wrist part is set to scan the transmission band selected for the first link communication through e.g. by switching on a triangular-wave formed voltage to the scan line and by closing the switch S3. The triangular wave is directed via the switch S3 and the resistance R4 to the capacitance diode D3. By the capacitance diode D3, it is controlled the frequency of the local oscillator 37 of the wrist part in relation to the change of the voltage in the scan line. The frequency formed by the local oscillator 37 of the wrist part is directed to the mixer 56 of the receiver of the wrist part. The radio-frequency signals received from the reception antenna 57 of the wrist part are directed via a third band-pass filter 54 to be amplified in the high-frequency amplifier 60 of the receiver of wrist part and further to the mixer 56 of the receiver of the wrist part. From the output of the mixer the difference signal between the local oscillator and the radio frequency signal to be received is directed via a fourth band-pass filter 63 to the detector 35 of the wrist part. Also the width of the pass band of the fourth band-pass filter 63 is substantially the same as the width of the channel. The output signal of the detector 35 is directed to the low-pass filter 76 of the detector of the wrist part in order to form an AFC signal. A demodulated signal is obtained from the audio line of the wrist part. When the data signal is being received, the signal is directed to the controller 34 of the wrist part which examines the received data by switching on the switch S14. The audio signal, however, is directed to the supplementary earpiece 13 by switching on the switch S12. Furthermore, the demodulated signal is further directed via a resistance R6 to the AFC line, the voltage level of which is controlled by the controller 34 of the wrist part. The locking to the frequency of the transmission is advantageously carried out by switching on the voltage of the AFC line to the capacitance diode D3 of the local oscillator of the wrist part by switching on the switch S11.

The data signal or audio signal modulated in the transmitter 39 of the wrist part is directed to the capacitance diode D4 which is in the oscillator circuit of the modulator 38. The basic frequency of this oscillator circuit is selected so that a frequency difference is provided between the radio frequency signal to be transmitted and the radio frequency signal to be received, said frequency difference corresponding to the value of the desired duplex separation. The controller 34 switches on the switch S4 as long as the data is being transferred, wherein a switch S5 is switched off. Correspondingly, as long as the analog signal is being transmitted, the controller 34 closes the switch S5 and opens the switch S4. Separating means R9, R10, which are connected in series with the switches S4, S5 operate as matching means. As the result of the modulation, a frequency modulated signal is provided, this being passed to the first input of the mixer 55 of the transmitter. The frequency of the local oscillator 37 of the wrist part is directed to the second input of the mixer 55. Thus, a frequency modulated transmission channel frequency signal of the wrist is obtained from the output of the mixer, said signal being further amplified in the high frequency amplifier 61 of the wrist part and low-pass filtered in the low-pass filter 40, e.g. in order to attenuate spurious emissions. From the low-pass filter the modulated radio-frequency signal is directed to the transmission antenna 53.

After the alarm has been generated, the controller 34 of the wrist part enters the modulator 38 of the wrist part with a command which is transmitted to the link module and whereby the link module 10 of the telephone is controlled to transmit the data of the incoming call to the wrist part 3. In the receiver 21 of the link module, the signal transmitted by the transmitter of the wrist part is demodulated and passed to the controller 27 of the link module, which interprets the command. On the basis of this the controller 27 of the link module fetches the data e.g. from the system connector 12 of the radio telephone 1, the link module 10 being connected to said system connector 12. In the link module, the data is modified, if this is necessary, and the modulator 29 of the link modulator is modulated by this data. The receiver of the wrist part receives the data which is modified by the controller 34 of the wrist part, and feeds the data to the display driver to be shown on the supplementary display means 11. Thus, the user can see on the supplementary display means 11 e.g. the telephone number or the name of the caller. In case the user wishes to answer the call he or she pushes the answering key 15, which is usually designated with a green handset. Based on the fact that the key has been pushed, the controller 34 of the wrist part transmits a message to the link module to open the call. Subsequently, the data transfer is terminated and the switch S2 in the modulator of the link module is opened. Correspondingly, the audio line is switched on, i.e., the switch S6 is closed. In the wrist part 3, the output of the detector is connected to the supplementary earpiece 13 of the wrist part by switching on the switch S12, and the input of the modulator to the supplementary microphone 14 of the wrist part by closing the switch S5. The audio lines 41, 42 are coupled in the link module 10 correspondingly to the external audio lines (EXT. AUDIO) of the system connector by switching on the switches S6 and S9. It is not necessary to switch on the earpiece 8 and the microphone 9 of the telephone part 2 itself. The telephone communication is now accomplished, wherein the supplementary earpiece 13 is pulled out, hand is taken to the ear and speech can be started. In case the quality of the communication between the telephone part 2 and the wrist part 3 is good, it is possible to make the entire call through the link. In case the quality is not sufficient, the other speaker is asked to hold until the telephone part 2 is reached, whereafter the call is continued. If the microphone 9 and the earpiece 8 of the telephone part have not been switched on in the beginning of the call, they are switched on at this point. The telephone part in accordance with FIG. 1b comprises switches S7, S8, which are switched on by the processor unit 50 of the radio part, wherein the call can be continued by using the telephone part 2.

Updating of the data on the supplementary display means 11 can be carried out at suitable intervals by transmitting the display data to the wrist part. However, the updating and the transmission of other data is not performed during the call in this embodiment. When using e.g. a digital link, it is possible to transmit speech and data at the same time.

One mechanical implementation principle of the wrist part 3 is shown in FIG. 1a. The transmitter/receiver 33, 39, controller 34, earpiece 13 and the microphone 14 of the wrist part are placed in the first wrist case 19a. The display means 11 and handset keys 15, 16 are placed in the second wrist case 19b. The transmission and reception antennas 53, 57 of the wrist part can be attached to the wrist strap 17, as well as the signal wires (not shown) between the first and second wrist case.

The link module 10 connected to the system connector 12 of the telephone part can also advantageously be of a so called Loop Through type, i.e., the other edge of the link module 10 has a similar system connector as the system connector 12 of the telephone part. At least charge contacts have advantageously been passed through the link module 10, wherein it is not necessary to remove the link module during the battery charge.

Thus, the wrist part 3 in accordance with the first embodiment of the invention is parallel with the user interface of the telephone itself, wherein the telephone part 2 can be used as a normal telephone, e.g. when the wrist part communication does not work due to external disturbances or other reasons. Although in the accompanying FIGS. 1a, 2, 3a and 4, the link module 10 is shown as a separate module connected to a telephone, it is possible to place the operations of the link module also into the telephone.

In practical embodiments of the transmitter/receivers of the wrist part and the link module, it is possible to use intermediate frequency circuits 43, 43' (IF) used e.g. in analog radio telephones, said intermediate frequency circuits comprising among other things a mixer, high-frequency and low-frequency amplifiers, limiter, and detector. The sensitivity of the circuits is sufficient for this purpose. The circuits are economical and they have a low power consumption. Further, for the implementation of the transmitter there exist ready-made FM modulators 44, 44'. The wrist part in accordance with the invention can also be non-chargeable battery operated because its power consumption can be made very low.

The controllers 27, 34 can be e.g. known micro controllers having, in addition to a processor, random access memory (RAM), input/output lines, analog/digital converter, digital/analog converter and read only memory (ROM). In particular, in such embodiments in which the link module 10 is implemented as a part of the telephone part 2, the functions of the link module controller can be implemented at least partially also in the application software of the controller of the telephone part 2.

The switches S1 to S14 are advantageously semiconductor switches, wherein the control of the switches is carried out by switching a voltage to the control line of the switch, said voltage having an off-mode at the first value, and an on-mode at the second value. The first voltage value is e.g. about 0V and the second value is close to the value of the operating voltage $V_{cc}$. Thus, the control line can be coupled to the binary I/O line (input/output) of the controller 27, 34, 50, e.g. two voltage values by the application software of the controller being possible to be set to said binary I/O line on the application software of the controller.

Figure 2:
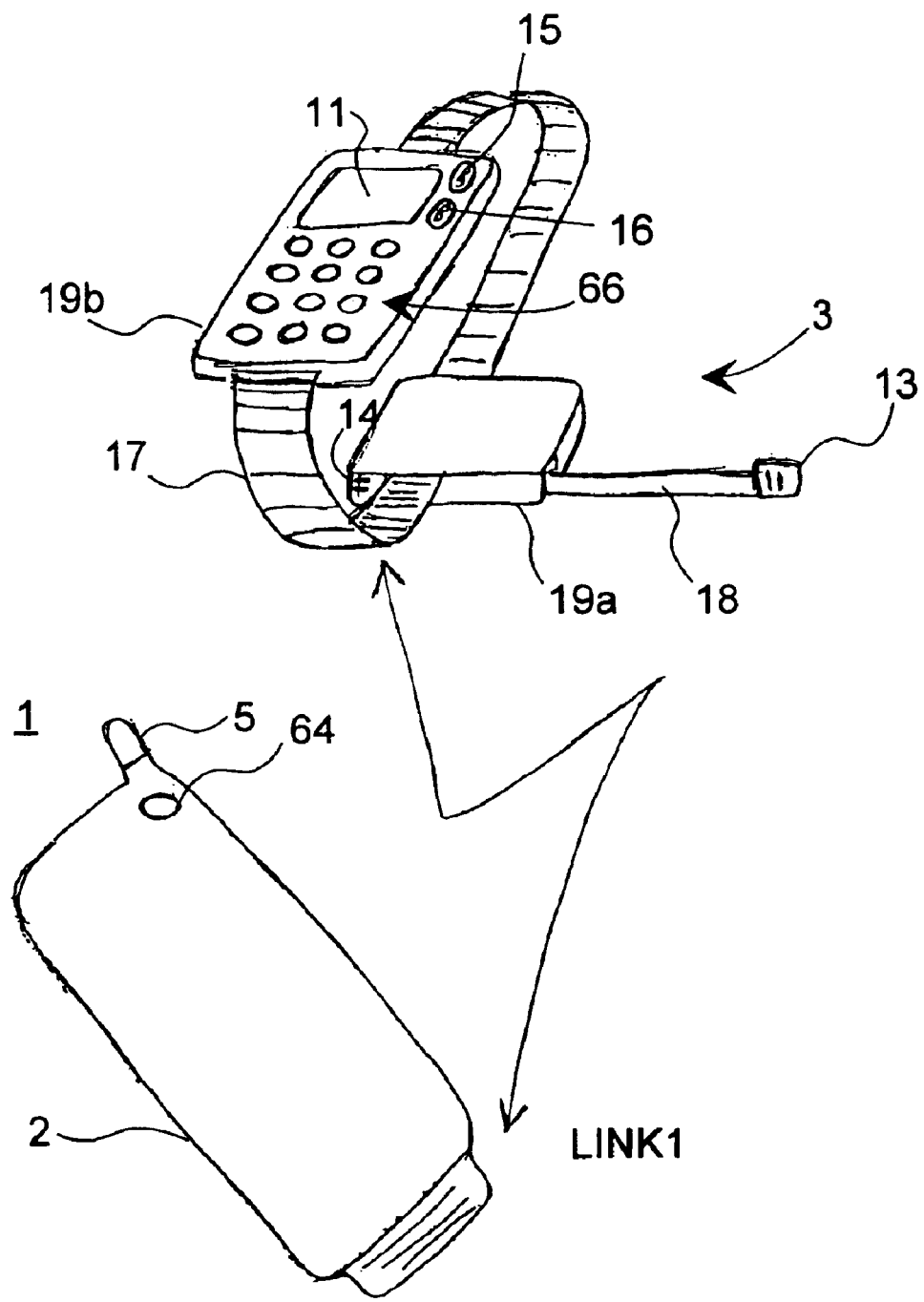
FIG. 2 shows a radio telephone in accordance with the second advantageous embodiment of the invention.

The invention can be applied also in a manner that the entire user interface is moved to the wrist part 3, and the telephone part 2 has no user interface: keypad 6, display device 7, earpiece 8 and microphone 9. Thus, the telephone part 2 mainly comprises the transmitter/receiver 49 of the radio part, antenna 5, power supply 65, operating switch 64, and data transfer means 10 for communication with the wrist part 3. Thus, The keypad 66 of the wrist part has all the keys required for call making, such as the number keys and the handset keys 15, 16. One exemplifying solution of this second advantageous embodiment of the invention is shown in FIG. 2.

Figure 3A:
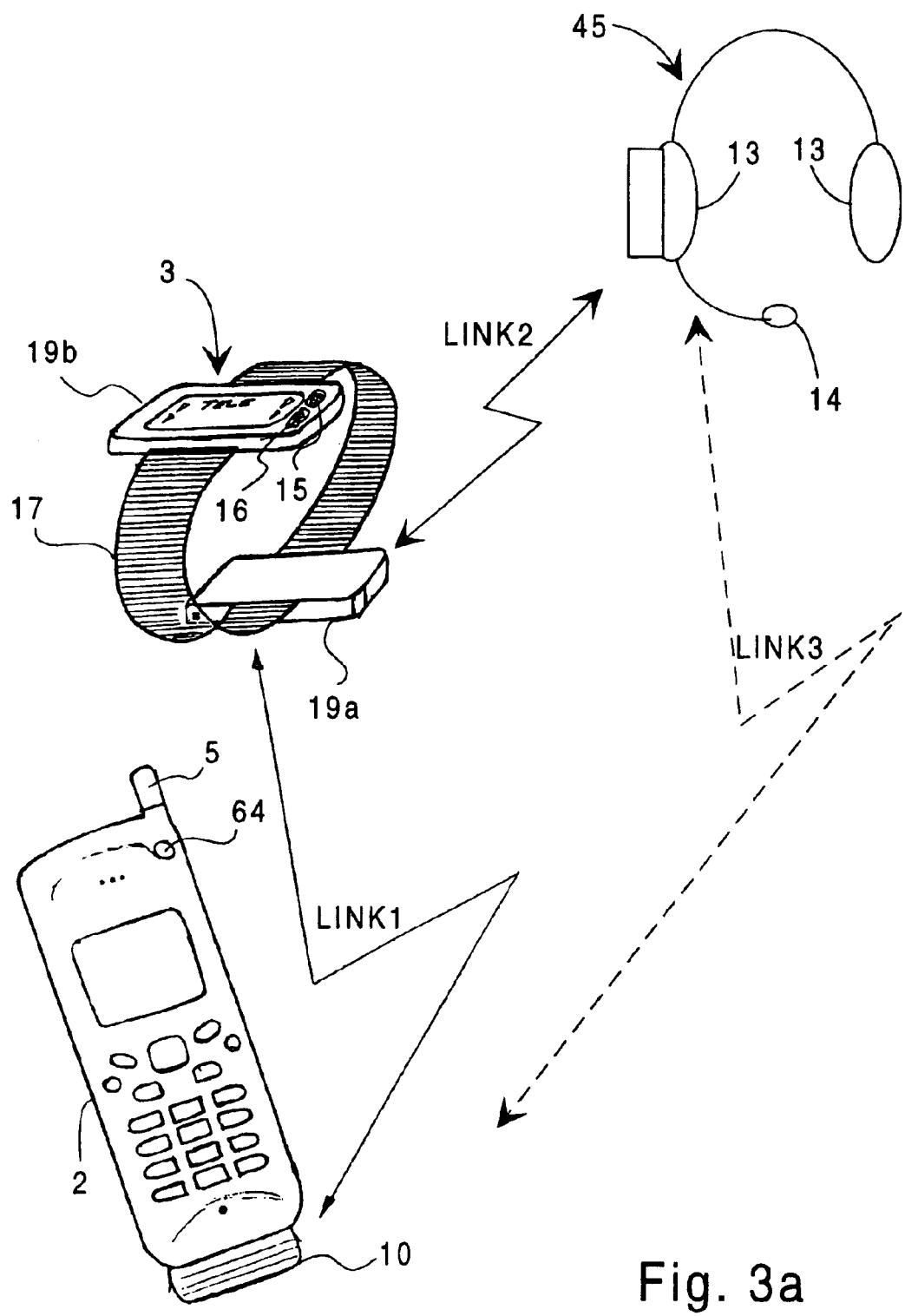
FIG. 3a shows a radio telephone in accordance with the third advantageous embodiment of the invention.
Figure 3B:
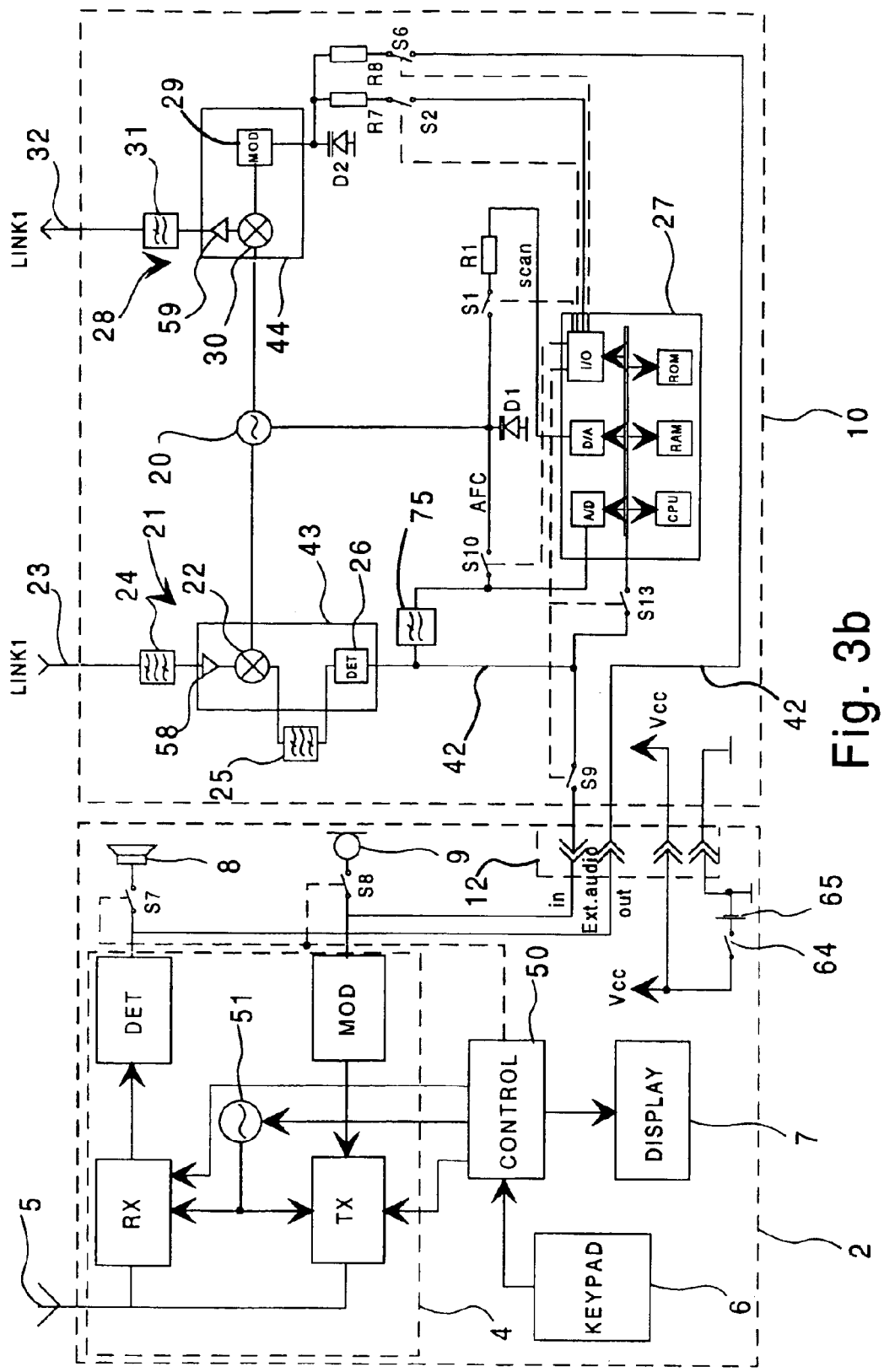
FIG. 3b shows a reduced block diagram of an advantageous alternative implementation of the data transfer means of the first part of the radio telephone in accordance with the third advantageous embodiment of the invention.
Figure 3C:
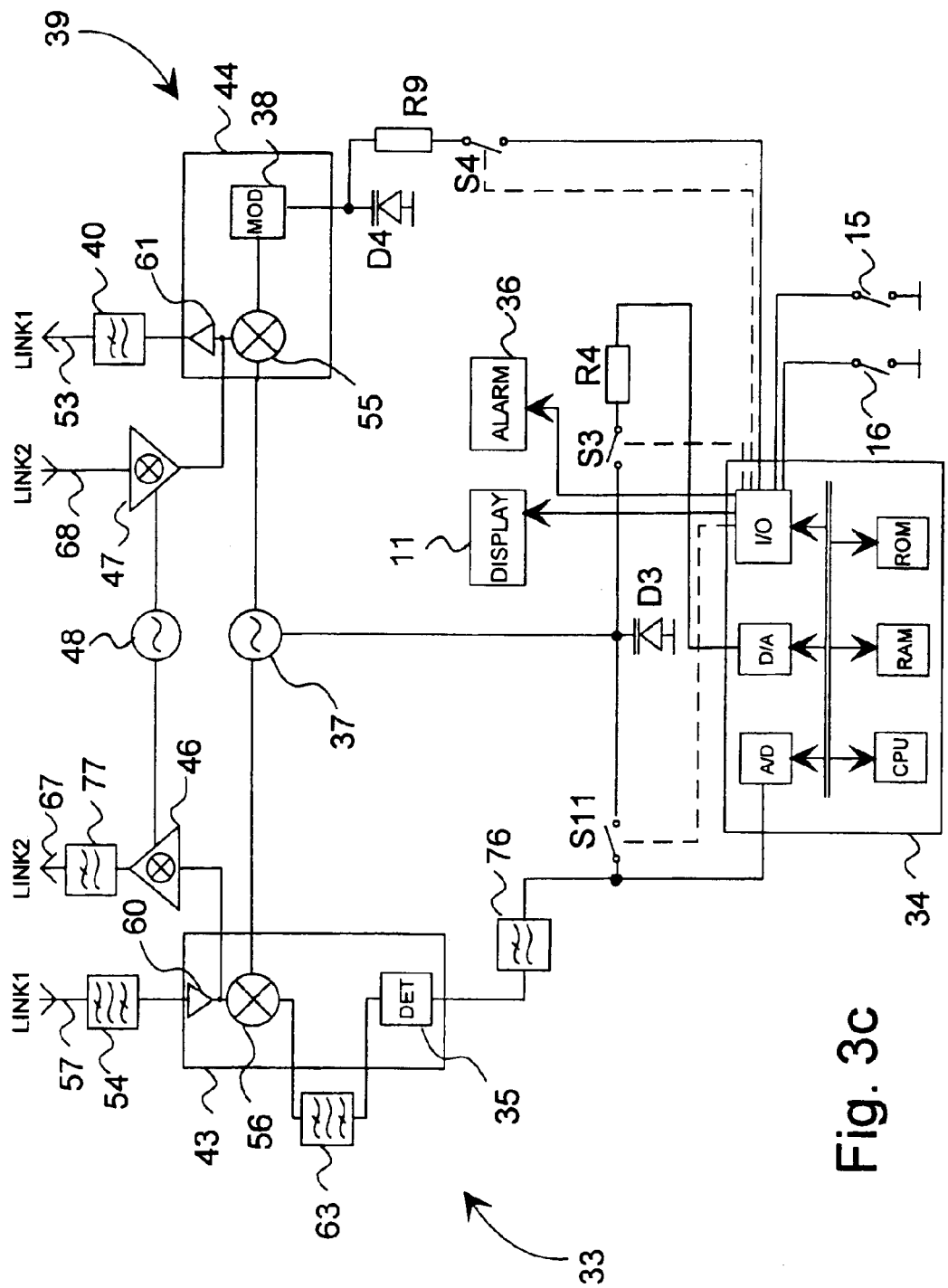
FIG. 3c shows a reduced block diagram of an advantageous alternative implementation of the data transfer means of the second part of the radio telephone in accordance with the third advantageous embodiment of the invention.
Figure 3D:
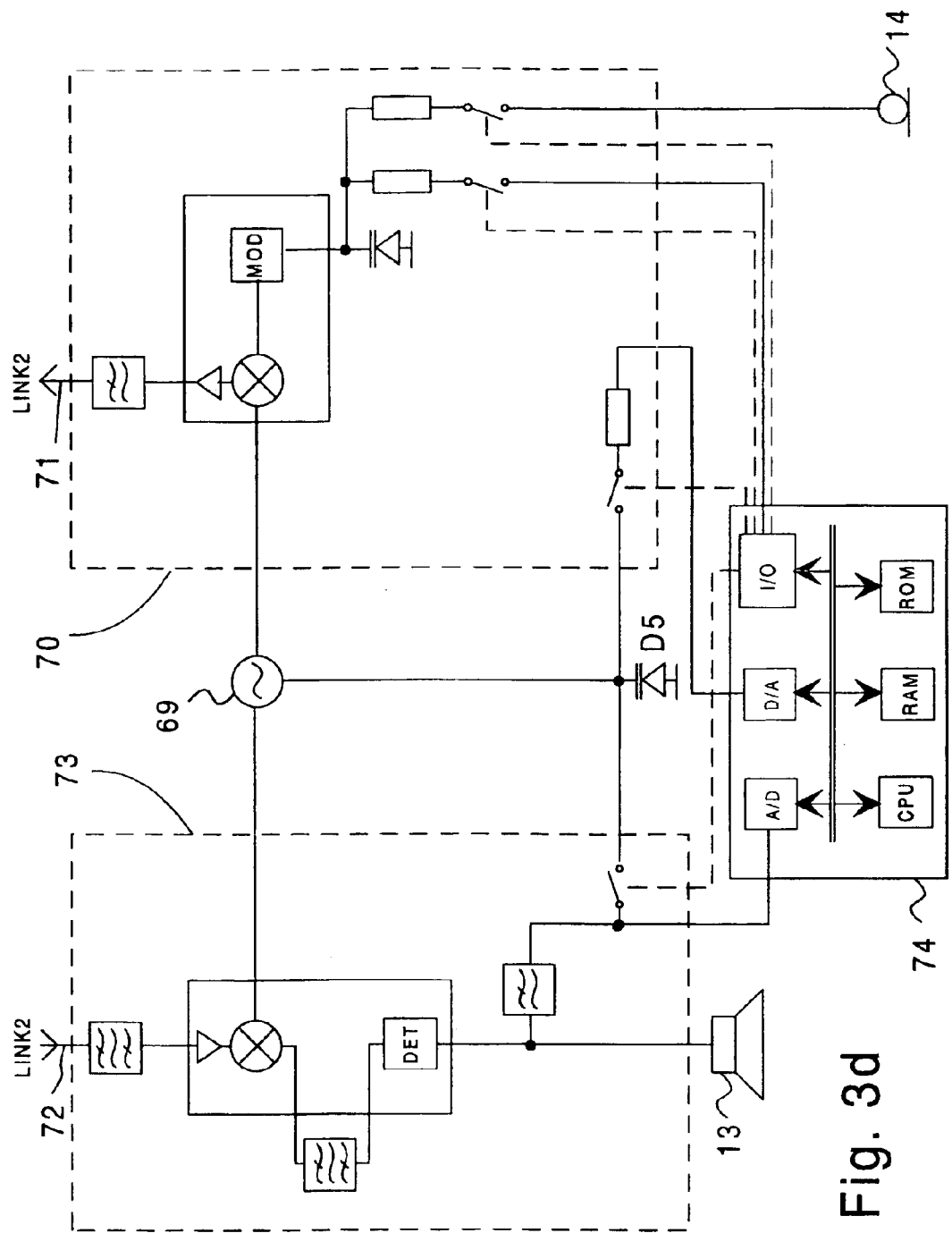
FIG. 3d shows a reduced block diagram of an advantageous alternative implementation of the data transfer means of the third part of the radio telephone in accordance with the third advantageous embodiment of the invention.

A radio telephone 1 in accordance with the third advantageous embodiment of the invention, shown in FIGS. 3a to 3d, is divided into three parts. The data transfer communication between the second and third part is in this context referred to as a second link communication LINK2, and the data transfer communication between the first and the third part is referred to as a third link communication LINK3. The first part, i.e., the telephone part, corresponds, in view of its substantial portions, to the telephone part 2 of the first embodiment. The second part, i.e., the wrist part 3, comprises a display device 11 and handset keys 15, 16 as well as data transfer means for the first link communication LINK1 for communication with the telephone part 2 and data transfer means for the second link communication LINK2 for communication with the third part, i.e., with the headset part 45. In this embodiment, the wrist part 3 functions as a repeater for the audio signals in data transfer between the telephone part 2 and the headset part 45. The headset part 45 comprises primarily audio parts, such as a supplementary earpiece 13 and a supplementary microphone 14, as well as communication means for the second link communication LINK2 for communication with the wrist part 3. In the wrist part 3, no detection is performed to audio signals travelling to either directions. Data signals transmitted from the link module are transferred between the telephone part 2 and the wrist part 3, but these are not directed to the headset part 45. However, between the wrist part 3 and the headset part 45 also data signals, such as a password, can be transferred to ensure that the headset part communicates with the right wrist part. The circuit diagram of FIG. 3d shows the communication means of the headset part for the second link communication LINK2 which comprises a transmitter 70, receiver 73, transmission and reception antennas 71, 72 and a local oscillator 69, whose frequency is controlled by capacitance diode D5. In view of the function of the communication means, reference is here made to an earlier illustration in this description of the operation of the transmitter/receivers 39, 33 of the wrist part.

In FIG. 3c, the block diagram of the wrist part 3 comprises a transmitter/receiver in accordance with the first embodiment of the invention, the transmitter/receiver being supplemented with converters 46, 47 and a local oscillator 48 of the converter. The high-frequency signals modulated with an audio signal and transmitted from the telephone part 2 are directed from a reception antenna 57 of the wrist part via a band-pass filter 54 and a high-frequency amplifier 60 to the transmission converter 46 where the frequency of the local oscillator 48 of the converter is mixed to the signal. The resulted mixing is directed via a low-pass filter 77 to a transmission antenna 67 of the converter. The high-frequency signal modulated with audio signal transmitted from a headset 45 are received by a reception antenna 68 of the converter and directed to the reception converter 47 where the frequency of the local oscillator 48 of the converter is mixed to the signal. The mixing result is directed via a low-pass filter 40 and a high-frequency amplifier 61 to the reception antenna 57.

The frequency of the local oscillator 48 of the converter is so selected that the channels of the second link communication LINK2 do not overlap with the channels of the first link communication LINK1.

Figure 4A:
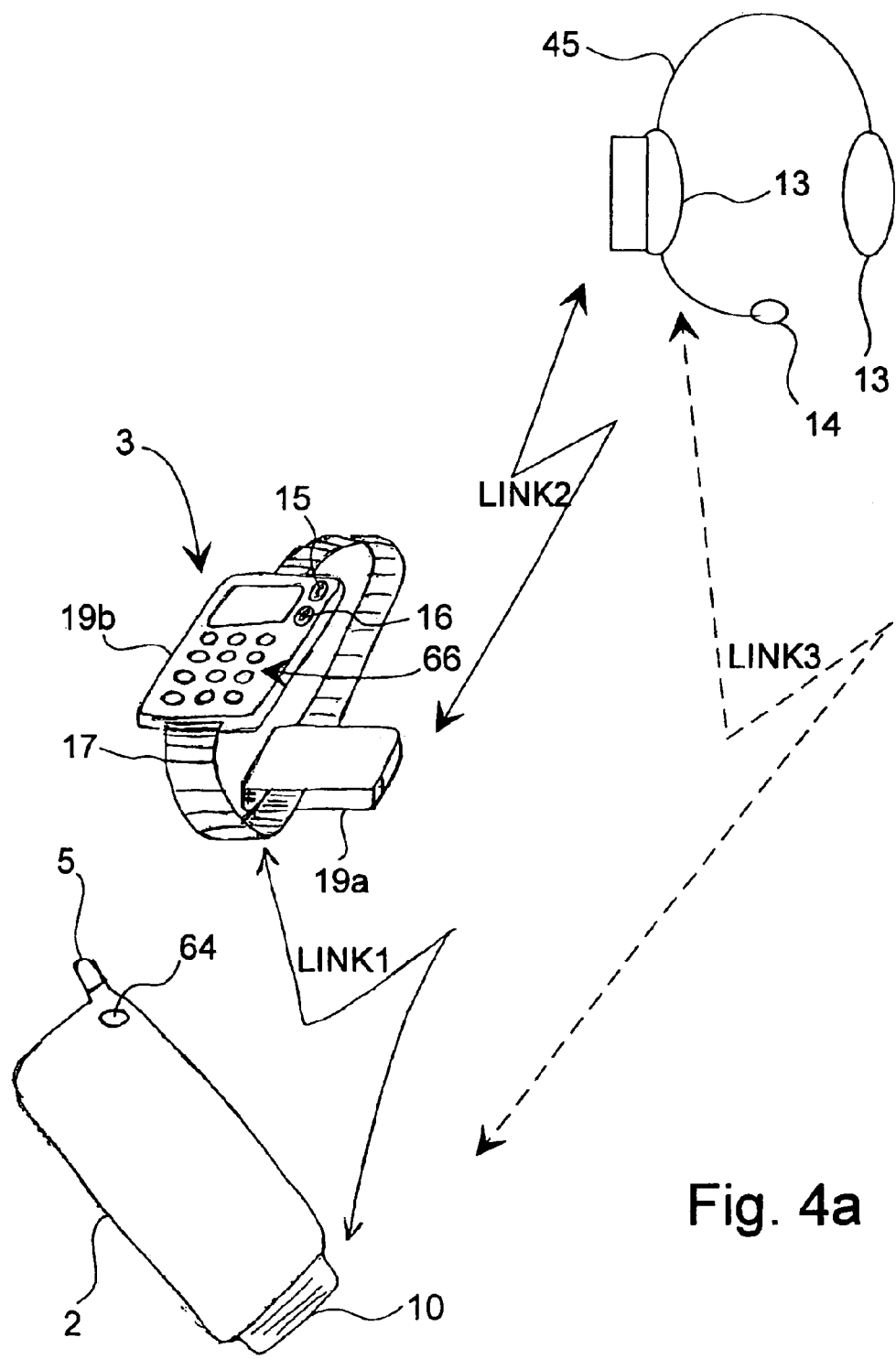
FIG. 4a shows a radio telephone in accordance with the fourth advantageous embodiment of the invention.
Figure 4B:
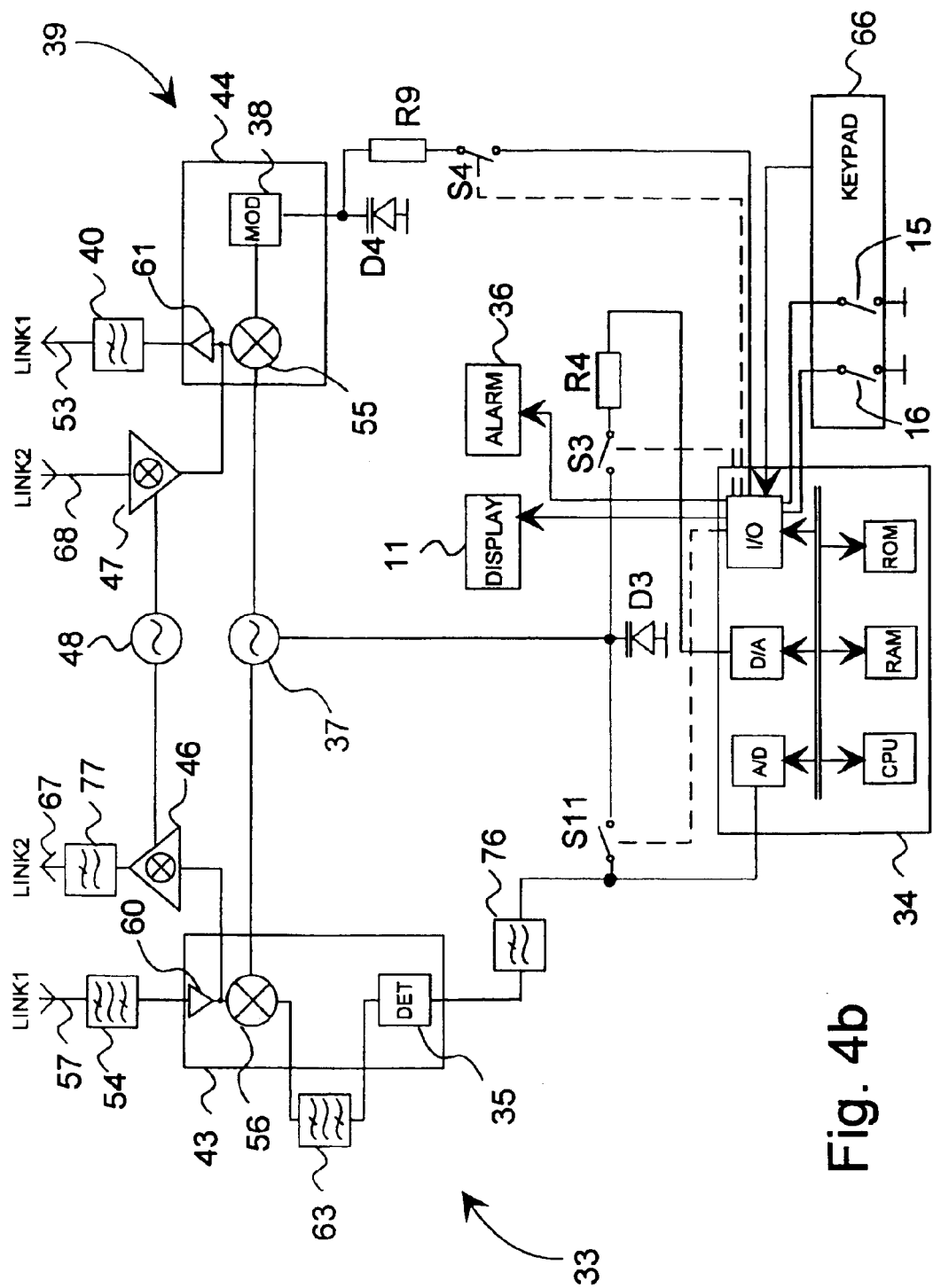
FIG. 4b shows a reduced block diagram of an advantageous alternative implementation of the data transfer means of the second part of the radio telephone in accordance with the fourth advantageous embodiment of the invention.

Also the radio telephone 1 in accordance with the fourth advantageous embodiment of the invention is divided into three parts (FIG. 4). The first part 2, i.e., the telephone part corresponds at its substantial portions to the telephone part 2 of the second embodiment, which telephone part comprises no user interface. The second part 3, i.e., the wrist part comprises a display device 11, a keypad 66 having all the keys required in making a call, such as number keys and handset keys 15, 16. A display means and a keypad are advantageously connected to the I/O lines of the controller 34 of the wrist part. The wrist part comprises also data transfer means 33, 39 for the first link communication LINK1 for communication with the telephone part 2 and data transfer means 46, 47, 48, 67, 68 for the second link communication LINK2 for communication with the third part, i.e., the headset part 45. The headset part 45 mainly comprises audio parts, such as a supplementary earpiece 13 and supplementary microphone 14, as well as communication means for a second link communication LINK2 to communicate with the wrist part 3. Since the telephone part 2 does not comprise a user interface in this embodiment, the call being made by using the keypad of the wrist part. In view of other respects, the operation according to the fourth embodiment of the invention corresponds substantially to the operation of the third embodiment of the invention.

A mobile station in accordance with the third and fourth embodiment of the invention can also be implemented in a manner that between the telephone part 2 and the wrist part 3 only data signals are transferred and audio signals are transferred directly between the telephone part 2 and the headset part 45 by using a third link communication. Thus, the telephone part 2 further comprises data transfer means for a third link communication LINK3 (not shown). The frequency band of the third link communication is advantageously selected in a manner that the difference of the channel frequencies of the third link communication and the channel frequencies of the first link communication is constant, wherein a local oscillator of the link module and a supplementary oscillator tuned to a stable frequency can be used in creating a local oscillator frequency in the data transfer means of the third link communication. Transmission of audio and data signals can be implemented by means of above mentioned data transfer methods, advantageously as a frequency modulated high-frequency signals.

The distance between the wrist part 3 and the headset part 45 is short, about 1 m, wherein a relatively low transmission power is sufficient.

In the telephone which is divided into three parts, the communication between the telephone part 2, the wrist part 3 and the headset part 45 can take place also in a manner that only the links LINK1 and LINK3 are used in a fashion that the links are identical. The data signal contained in the link communication is indicated in the wrist part and the wrist part correspondingly transmits only the data. In the headset part, the audio signal contained in the link communication is detected to the earpiece 13 and the headset modulates the link signal by a audio signal obtained from the microphone 14. If necessary, it is possible to detect in the headset part also a part of the data signal e.g. to control the signal strength levels of the earpiece and the microphone.

The headset of the radio telephone in accordance with the third and fourth embodiment of the invention can be e.g. a known headphone-microphone combination set on the user's head, wherein the headphone (headphones) and the microphone can be immediately used and both hands are free during the call.

Figure 7A:
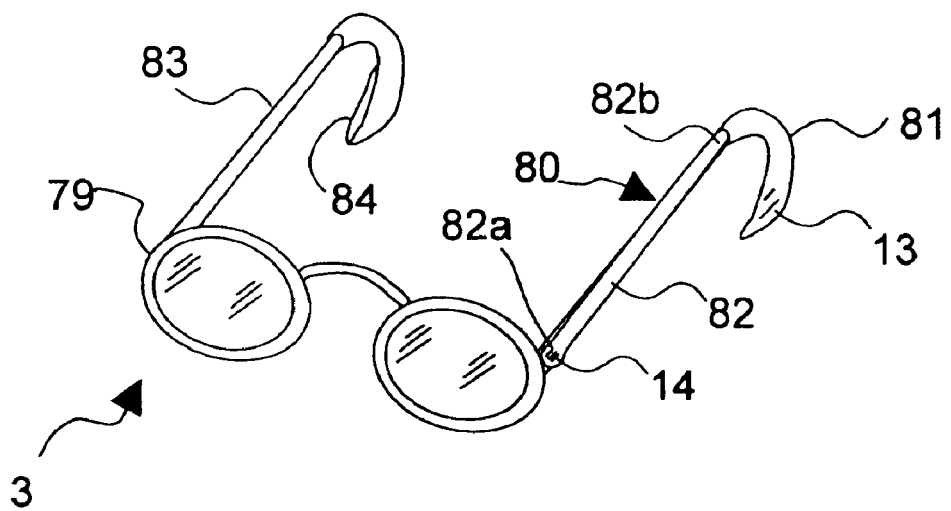
FIGS. 7a and 7b show still another construction for the second part 3 of the radio telephone according to the invention in a skeleton diagram.
Figure 7B:
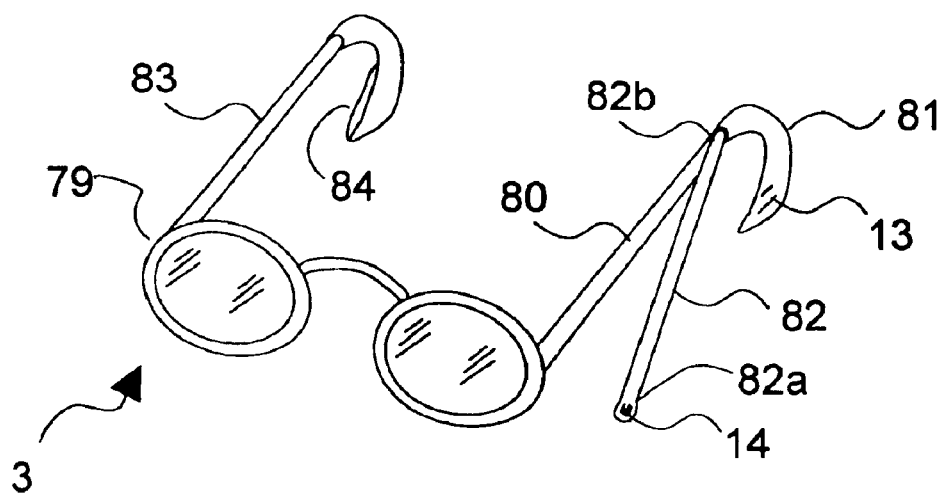

FIGS. 7a and 7b show still another construction for the second part 3 of the radio telephone according to the invention in a skeleton diagram. The second part 3 is arranged in connection with spectacles 79, sunglasses or the like. A supplementary earphone 13 is arranged advantageously in the earpiece 81 of the first arm 80 of the spectacles, for example inside the earpiece 81. A supplementary microphone 14 is placed in this embodiment at the first end 82a of an auxiliary arm 82. The auxiliary arm is fixed with hinges from the second end 82b of the auxiliary arm to the first arm 80 of the spectacles. The second part 3 comprises advantageously also means for answering a call, arranged e.g. with a switch (not shown) placed at the second end 82b of the auxiliary arm so that when the second part is in standby (FIG. 7a), the switch is in the first state, for example open. When answering to an incoming call, the auxiliary arm 82 is turned downwards, as shown in FIG. 7b. The switch is then in the second state (closed), whereby the controller 34 of the second part detects the change in the state of the switch and starts setting up a link connection, as described above in this description. Upon terminating the call, the auxiliary arm 82 is turned back substantially parallel to the arm 80, whereby the switch changes its state and the link connection can be closed. In this advantageous embodiment, it is possible to use solutions presented above in this description for implementation of the transceiver of the second part, the controller etc. In FIGS. 7a and 7b, the reference numeral 84 indicates a housing where these can be advantageously accommodated. The wirings between the auxiliary earphone 13, the auxiliary microphone 14, the transceiver, etc. are arranged e.g. inside or on the outer surface of the arms 80, 83.

On the basis of what was presented above, it is obvious that this spectacle solution can also be applied in a radio telephone according to the third and fourth embodiments of the invention, consisting of three parts, whereby the headset part 45 is arranged in connection with the spectacles 79 and comprises e.g. an auxiliary earphone 13, an auxiliary microphone 14, and communication means for the second link connection LINK2. The means for answering a call are thus preferably integrated in the second part 3 of the radio telephone.

The mechanical implementation of the second part 3 can be of a different type than the above-presented part placed in wrist. It can be for example a thin, card-like unit, which can be placed for example in a breast pocket, or the second part 3 can be for example a pen-like unit.

Figure 5:
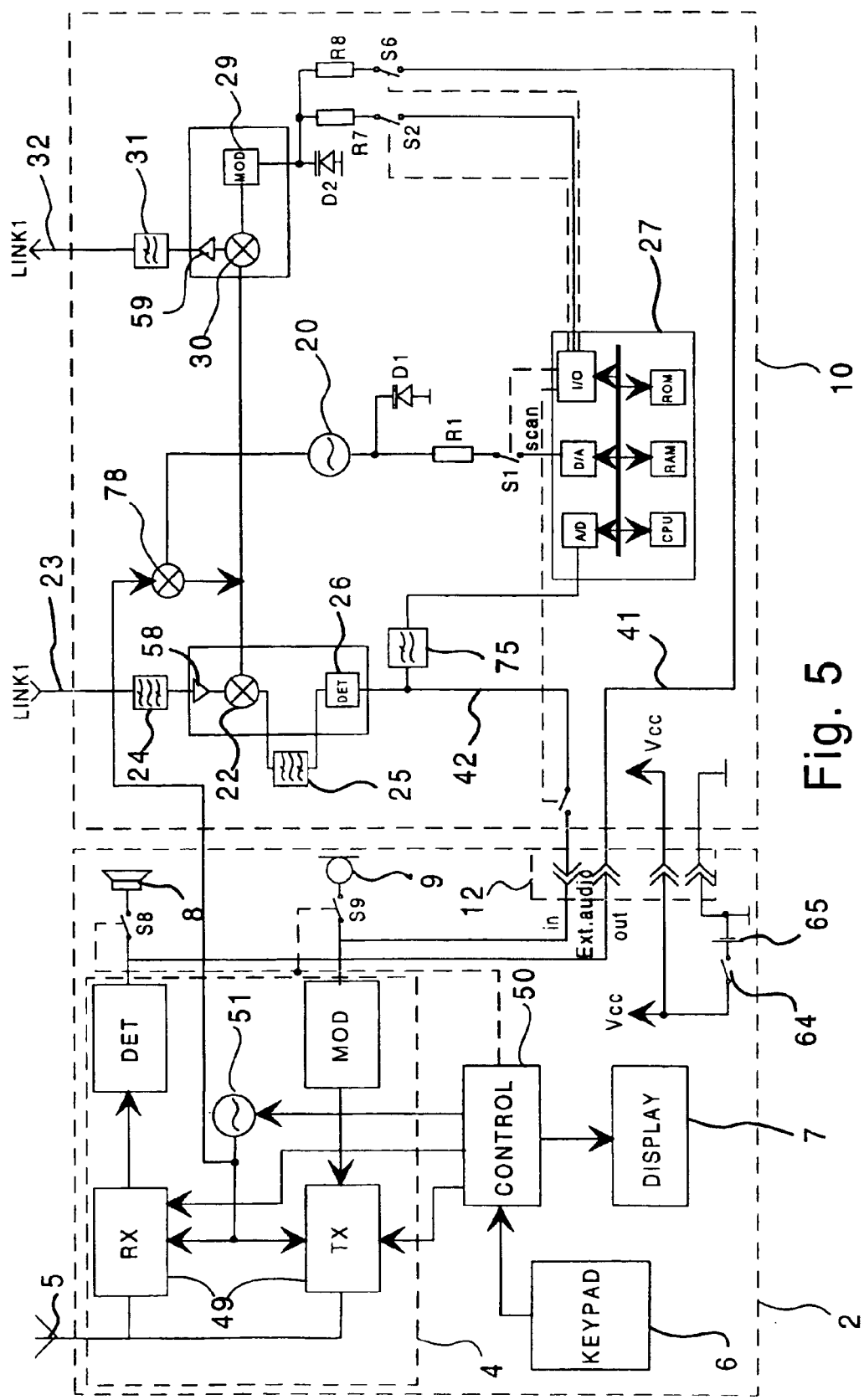
FIG. 5 shows a reduced block diagram of the second advantageous alternative implementation of the control of link frequencies.

Earlier in this description, an alternative implementation was introduced for selecting a frequency (channel) used in the link communication LINK1, LINK2, LINK3 by scanning through the reception band used and by searching the vacant channels. FIG. 5 shows an alternative method for selecting the frequency used in the link communication.

Radio telephone cellular network controls the frequencies of the radio telephones in the network in a manner that in the same cell, i.e., in the same geographical area the simultaneously active radio telephones use different transmission/reception frequency and/or different time slots, i.e., each radio telephone has its own individual traffic channel. This information is utilized in a manner that the link frequency is tied to the frequency and/or time slot used by the radio part of the radio telephone, by which frequency and/or time slot the radio telephone communicates with the base station. When the frequency of the link is, in all analog radio telephones, at a fixed frequency difference, e.g. from the frequency of the transmitter of the telephone, and the transmitters of the radio part 4 of all the radio telephones operating in the same cell are in different frequencies, this means that also the link frequencies of the radio telephones in the cell are different. In a radio telephone 1 in accordance with FIG. 5 the local oscillator 51 of the transmitter/receiver 49 of the radio part creates a transmission and reception frequency to the transmitter/receiver 49. The same frequency of the local oscillator 51 of the transmitter/receiver of the radio part is utilized by mixing it or a radio part frequency related thereto to the frequency of the local oscillator of the module of the mixer 78 of the link module to create a link frequency, i.e., the link frequency follows the frequency of the local oscillator 51 of the radio part, however, remaining at a constant frequency difference thereof. In this manner, the link frequencies of the radio telephones in the same cell are prevented from being set to the same frequency. A mixing can be an up mixing or down mixing depending on the link frequency used.

Figure 6:
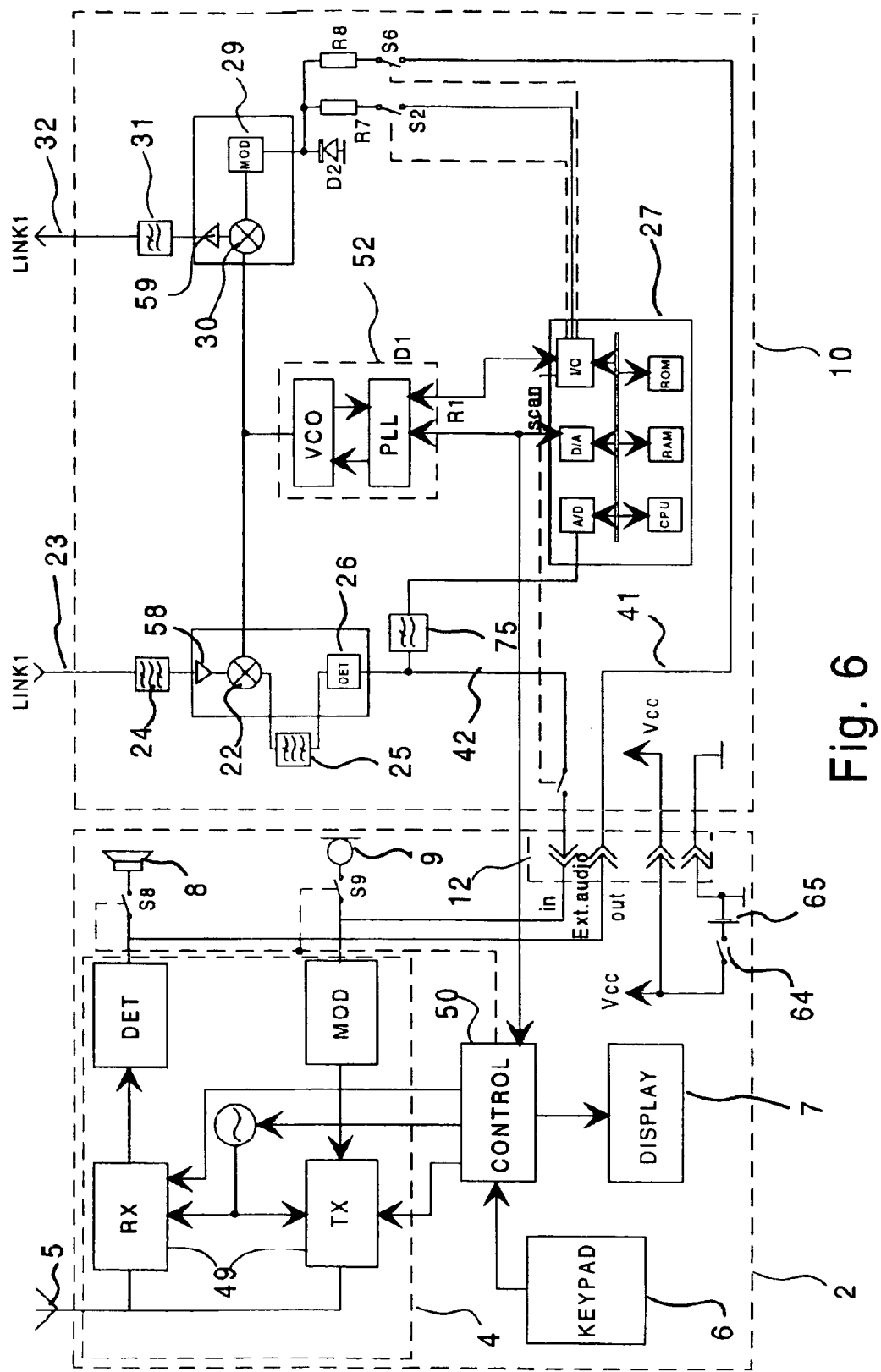
FIG. 6 shows a reduced block diagram of the third advantageous alternative implementation of the control of link frequencies.

The third advantageous embodiment of the control of link frequencies, as shown in FIG. 6, comprises a synthesizer 52 for creating a link frequency. In this embodiment, the synthesizer comprises a phase locked loop (PLL) and a voltage controlled oscillator (VCO). The control voltage of the voltage controlled oscillator is changed by changing the division ratio in the phase locked loop, wherein the frequency of the voltage controlled oscillator is changed. The controller 50 of the radio part has the information of the frequencies/time slots used by the transmitter/receiver 49 of the radio part, i.e., the traffic channel. By utilizing this information, the processor unit 50 of the radio part controls the synthesizer 52 of the link in order to set the link frequency. The processor unit simultaneously attends to that the link frequency has predetermined frequency difference to the transmission and reception frequency of the transmitter/receiver 49 of the radio part.

In digital phones, such as e.g. TDMA (GSM, PCN) and CDMA, several telephones can simultaneously be active in the same cell and operate in the same frequency. In the TDMA system, telephones communicating in the same frequency use different time slots, by which the telephones are prevented from disturbing each other.

In the CDMA (code division multiple access) system telephones communicate simultaneously in the same frequency. CDMA is based on spread spectrum communication technique. Each channel has an individual pseudorandom binary sequence by which the carrier wave is modulated and the spectrum is spread. Signals are separated in the reception by using a correlator which accepts the signal energy of only the selected binary sequence and despreads its spectrum.

The embodiment in accordance with FIG. 6 can also be used in telephone systems where several telephones of the same cell communicate simultaneously in the same frequency.

Each telephone present in the same cell has an individual traffic channel (channel number) by which it communicates with the base station. When the link channels LINK1, LINK2, LINK3 are tied to the channel number in a manner that each traffic channel of the telephone, telephone⇌base station, has a respective individual link channel, it is possible to eliminate disturbances between the telephone links.

Further, it is possible to use time division on the link channels LINK1, LINK2, LINK3 of digital telephones, in a manner that traffic channels, telephone⇌base station in the same frequency transfer the data of the time slot they had used to the link LINK. This data is present in the processor unit 50 of the radio part, the processor unit being capable of controlling the PLL unit 52 and the control unit 27 of the link module. Thus, the link of each telephone operates only within the time slot reserved therefor and disturbances between the telephones are prevented. Since the link LINK frequency is different from the frequency of the traffic channel, it may be that the time slots used by the link are different than the time slots of the traffic channel as long as each traffic channel or group of channels has its respective individual link channel. Also, frequency hopping can be used in the link, so that each link channel has its own individual hopping sequence, which prevents disturbances between the telephones.

In the link, it is also possible to use spread spectrum communication of the CDMA system, wherein each link channel has a different pseudorandom binary sequence, wherein disturbances between telephones which are close to each other is prevented. Here as well, it is substantial that each traffic channel or group of channels, telephone⇌base station, has a respective different pseudorandom binary sequence in the link.

The use of the TDMA or CDMA technique also make it possible for the transmitter and receiver of the link to operate in the same frequency, i.e., the link for example transmits and receives in the same frequency, but at different time slots or by using different pseudorandom binary sequences.

The same principle of creating link channels can be used in communication between the telephone and its accessories.

In the embodiments in accordance with the invention only the substantial properties of the invention are described. For example the link receivers and the transmitters can be implemented in a manner that several intermediate frequencies are used, which is known to an expert in the field.

Although it is advantageous to apply the invention in such radio telephones which are regarded to operate as portable telecommunication terminals, the invention can also be applied in radio telephones in which the communication is created between two radio telephones, possibly via one or several base stations.

Figure 8:
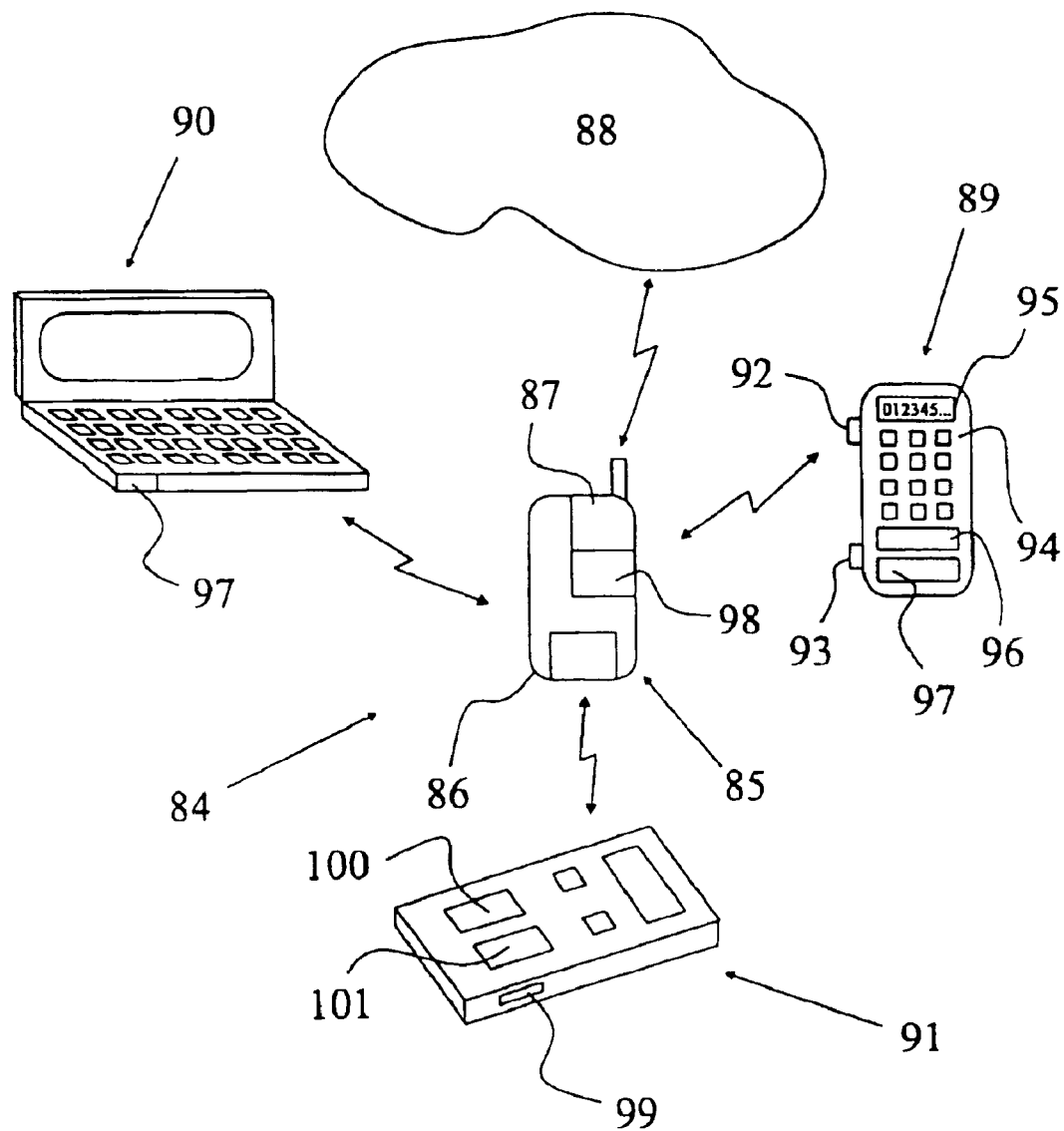
FIG. 8 shows a modular radio telephone apparatus.

FIG. 8 shows a modular radio telephone apparatus indicated generally by the reference numeral 84. The apparatus comprises a core module unit 85 consisting of a housing 86 and, contained within the housing, a radio transceiver (transmitter/receiver) 87. The transceiver 87 functions in the manner described above, with reference to the embodiments of FIGS. 1 to 7, to communicate with a cellular radio telephone network 88, e.g. a GSM network. The core module 85 does not have a conventional telephone user interface and a user cannot make or receive a telephone call using the core module 85 alone.

The core module 85 communicates with one of a number of 'peripheral' modules 89, 90 91, each of which contains an independent power supply (not shown). Shown in FIG. 8, by way of example, are three peripheral modules which each provide a different user function. A first module 89 is a credit card sized module comprising a microphone 92, an earpiece 93, a numeric keypad 94, and an LCD display 95. Each of these components is coupled to a data processor 96 within the module which is in turn coupled to a low power radio transceiver 97. This transceiver 97 is able to communicate wirelessly with a corresponding low power transceiver 98 in the core module 85. The peripheral module 89 therefore provides a first user interface for the apparatus 84 allowing a user to make and receive voice calls via the core module 85.

A second module 90 illustrated in FIG. 8 has the form of a palm-top computer or personal digital assistant (PDA) containing a microprocessor (not shown). The module 90 again contains a low power transceiver 97 for communicating with the core module 85. The second module may be used to make and receive data calls, e.g. short message service (SMS), facsimile, and e-mail.

The third peripheral module 91 comprises a blood glucose measuring device including a slot 99 for the insertion of a blood glucose test strip. A measuring device for communicating with a radio telephone network is described, for example, in WO 97/28736 and WO 97/28737. Data processing means 100 within the module communicates measured blood glucose levels to a low power radio transceiver 101. As will be understood, this transceiver 100 transmits the data to the low power receiver 99 of the core module 85. The third module 91 is also able to receive data from the network 88, via the core module 85. This data may relate to a patient treatment regime determined in accordance with the measured blood glucose levels.

From the detailed description given above with reference to FIGS. 1 to 7, it will be understood how the 'link' connection between the core module 85 and the peripheral modules 89, 90, 91 may be implemented. It will also be apparent how the peripheral modules may be operated interchangeably with the core module.

Advantageously, interference between two or more peripheral modules is avoided by assigning different local radio traffic channels (uplink and downlink) to different peripheral modules. For example, channels may be spaced apart, in the frequency domain, by a fixed amount. Moreover, in order to avoid interference between local communications performed by different radio systems within an overlapping transmission area, the frequencies assigned to the local communications of a given core module are fixed relative to the frequencies on which the core module communicates with the telephone network. Alternatively, separation may be achieved by separating the various channels, by fixed amounts, in the time domain. In yet another alternative, local traffic channels may be assigned to individual modules by the network, these channels being identified in messages sent over the network traffic channels.

The invention is not districted merely to the above described embodiments, instead it can be modified within the scope of the accompanying claims.

What is claimed is:

1. A radio telephone for use in close proximity to a user comprising:
   a transceiver for communicating with a radio telephone network over a network assigned channel;
   an antenna connected to the transceiver for receiving and transmitting signals from and to said radio telephone network;
   a controller connected to said transceiver to control the communications and for processing the information being transmitted or received in said communication by said radio telephone;
   a user interface connected to said controller constructed to allow said user to receive and send audio and data information via communication with said radio telephone network;
   a local communication module connected to said controller for generating a first bidirectional local wireless communication link to allow the transmission and reception of communications processed by said controller, said local communications link using time division multiple access with frequency hopping or code controlled multiple access with individual pseudorandom binary sequencing to avoid interference with said radio telephone network communication; and
   a first remote unit adapted to be supported on the person of said user, said remote unit having a transceiver and a controller for receiving and sending information over said first local communication link, said remote unit constructed to allow said user to receive and send information over said local communication link to said radio telephone network through said radio telephone.

2. A radio telephone for use in close proximity to a user, according to claim 1, wherein the user interface of said radio telephone is constructed as part of the remote unit.

3. A radio telephone for use in close proximity to a user, according to claim 1, wherein a second user interface is constructed as part of the remote unit to allow the user to communicate over said local communication link.

4. A radio telephone for use in close proximity to a user, according to claim 1, further comprising;
   a second remote unit, adapted to be supported on the person of the user, said second remote unit connected to said first remote unit by a second local wireless communication link generated by said first remote unit, and wherein said first and second remote units have tranceivers and controllers for communicating over said second wireless communication link, said second remote unit further comprising headset for communicating audio data to and from said first remote unit.

5. A radio telephone for use in close proximity to a user, according to claim 1, wherein the first local communication link is transmitted on a first frequency channel and the reception channel frequency is set at a at a frequency having a predetermined fixed relation with said transmission frequency.

6. A radio telephone for use in close proximity to a user, according to claim 1, wherein said local communication module is turned on only during a call and said transceiver of said remote unit is turned on periodically to check said local communication link for a message or a call in order to conserve power.

7. A radio telephone for use in close proximity to a user, according to claim 1, wherein said first remote unit comprises a fully functional radio telephone operational on said first local channel.

8. A radio telephone for use in close proximity to a user comprising:
- a transceiver for communicating with a radio telephone network over a network assigned channel;
- an antenna connected to the transceiver for receiving and transmitting signal from and to said radio telephone network;
- a controller connected to said transceiver to control the communications and for processing the information being transmitted or received in said communication;
- a user interface connected to said controller constructed to allow said user to receive and send audio and data information via communication with said radio telephone network;
- a local communication module connected to said controller for generating a first bidirectional local wireless communication link to allow the transmission and reception of communications processed by said controller, said local communications link using time division multiple access with frequency hopping or code controlled multiple access with individual pseudorandom binary sequencing to avoid interference with said radio telephone network communication; and
- a first remote unit adapted to be supported on the person of said user, said remote unit having a transceiver and a controller for receiving and sending information over said first local communication link, said remote unit constructed to allow said user to receive and send information over said local communication link; and
- wherein said local communication module further comprises:
- a synthesizer for establishing a frequency for operation of said first local communication link, said synthesizer having a phase locked loop and a voltage controlled oscillator operationally associated therewith wherein said synthesizer changes the frequency of the voltage controlled oscillator by changing a division ratio in said phase looked loop, said synthesizer setting the frequency of said local communication link at a fixed relation to said network assigned channel.

9. A radio telephone for use in close proximity to a user, according to claim 4, wherein the first and second remote units communicate over the second local communication channel using time division multiple access.

10. A radio telephone for use in close proximity to a user comprising:
- a transceiver for communicating with a radio telephone network over a network assigned channel;
- an antenna connected to the transceiver for receiving and transmitting signals from and to said radio telephone network;
- a controller connected to said transceiver to control the communications and for processing the information being transmitted or received in said communication by said radio telephone;
- a user interface connected to said controller constructed to allow said user to receive and send audio and data information via communication with said radio telephone network;
- a local communication module connected to said controller for generating a first bidirectional local wireless communication link to allow the transmission and reception of communications processed by said controller, said local communications link using time division multiple access with frequency hopping or code controlled multiple access with individual pseudorandom binary sequencing to avoid interference with said radio telephone network communication; and
- a first remote unit adapted to be supported on the person of said user, said remote unit having a transceiver and a controller for receiving and sending information over said first local communication link, said remote unit constructed to allow said user to receive and send information over said local communication link to said radio telephone network through said radio telephone;
- a second remote unit, adapted to be supported on the person of the user, said second remote unit connected to said first remote unit by a second local wireless communication link generated by said first remote unit, and wherein said first and second remote units have tranceivers and controllers for communicating over said second wireless communication link, said second remote unit further comprising headset for communicating audio data to and from said first remote unit; and
- wherein said second remote unit requires identification by said first remote unit to complete the second local communication link and said identification is provided by the transmission of a password consisting of the equipment identification code by said second remote unit.

11. A radio telephone for use in close proximity to a user comprising:
- a transceiver for communicating with a radio telephone network over a network assigned channel;
- an antenna connected to the transceiver for receiving and transmitting signals from and to said radio telephone network;
- a controller connected to said transceiver to control the communications and for processing the information being transmitted or received in said communication, by said radio telephone;
- a local communication module connected to said controller for generating a first bidirectional local wireless communication link to allow the transmission and reception of communications processed by said controller, said local communications link using time division multiple access with frequency hopping or code controlled multiple access with individual pseudorandom binary sequencing to avoid interference with said radio telephone network communication; and at least one remote unit adapted to be supported on the person of said user, said remote unit having a transceiver and a controller for receiving and sending information over said first local communication link, said at least one remote unit having a user interface for allowing communication over said network assigned channel via said local communication link to said radio telephone network through said radio telephone.

12. A radio telephone for use in close proximity to a user, according to claim 11 wherein said user interface is constructed as a credit card sized module comprising an earpiece, a microphone, a numeric keypad, and an LCD display.

13. A radio telephone for use in close proximity to a user, according to claim 11 wherein said at least one remote unit is comprised of a palm-top computer or a personal digital assistant.

14. A radio telephone for use in close proximity to a user, according to claim 11 wherein said at least one remote unit further comprises a plurality of additional remote units selected from the group consisting of a credit sized module comprising an earpiece, a microphone, a numeric keypad, and an LCE display, palm-top computer, or a personal digital assistant.

* * * * *